US011210294B2

United States Patent
Martinetti (10) Patent No.: US 11,210,294 B2
(45) Date of Patent: Dec. 28, 2021

(54) METHOD, IMPLEMENTED BY COMPUTER, FOR SEARCHING FOR RULES OF ASSOCIATION IN A DATABASE

(71) Applicant: Quantics Technologies, Paris (FR)

(72) Inventor: Stéphane Martinetti, Bordeaux (FR)

(73) Assignee: Quantics Technologies, Paris (FR)

( * ) Notice: Subject to any disclaimer, the term of this patent is extended or adjusted under 35 U.S.C. 154(b) by 48 days.

(21) Appl. No.: 16/612,295

(22) PCT Filed: Apr. 17, 2018

(86) PCT No.: PCT/FR2018/050965
§ 371 (c)(1),
(2) Date: Nov. 8, 2019

(87) PCT Pub. No.: WO2018/206871
PCT Pub. Date: Nov. 15, 2018

(65) Prior Publication Data
US 2021/0157815 A1    May 27, 2021

(30) Foreign Application Priority Data
May 9, 2017 (FR) ..................................... 1754037

(51) Int. Cl.
*G06F 17/00* (2019.01)
*G06F 16/2455* (2019.01)
(Continued)

(52) U.S. Cl.
CPC .. *G06F 16/24564* (2019.01); *G06F 16/24578* (2019.01); *G06F 16/284* (2019.01); *G06K 9/3233* (2013.01)

(58) Field of Classification Search
CPC .......... G06F 16/11; G06F 16/13; G06F 16/24; G06F 16/156; G06N 3/00; G06N 5/00; G05B 13/00
See application file for complete search history.

(56) References Cited

U.S. PATENT DOCUMENTS 5,842,200 A * 11/1998 Agrawal ................ G06Q 30/02
5,983,222 A * 11/1999 Morimoto ........... G06F 16/2465
(Continued)

OTHER PUBLICATIONS

International Search Report (English translation provided) and Written Opinion PCT/FR2018/050965 dated Jul. 4, 2018.
(Continued)

*Primary Examiner* — Hung D Le
(74) *Attorney, Agent, or Firm* — Patterson Thuente Pederson, PA (57) ABSTRACT

A method for searching for rules of association in a database. A list of instances exhibiting a set of real numerical values taken by a predetermined number of variables, including: —selecting a set of NI input variables from among the variables of the list of instances, the input variables defining a space of dimension NI; and selecting of an output variable from among the remaining variables; —the ordering, for each input variable of the selected list of instances, of the numerical values of the instances for this variable, each instance then being defined by a set of ranks, and being represented by a point in the space of dimension NI; —the definition of at least one modality for the selected output variable; —the exploration, in sub-spaces of the space of dimension NI, of right convex regions; —the selection, from among the explored right convex regions, of regions of interest.

9 Claims, 7 Drawing Sheets

(51) Int. Cl.
*G06F 16/28* (2019.01)
*G06F 16/2457* (2019.01)
*G06K 9/32* (2006.01)

(56) References Cited

U.S. PATENT DOCUMENTS

| | | | | |
|---|---|---|---|---|
| 7,370,033 | B1* | 5/2008 | Roychowdhury | G06Q 30/02 707/602 |
| 2005/0060103 | A1* | 3/2005 | Chamness | G05B 23/024 702/30 |
| 2014/0198986 | A1* | 7/2014 | Marchesotti | G06K 9/622 382/190 |
| 2014/0365389 | A1* | 12/2014 | Cheek | G06Q 10/105 705/320 |
| 2014/0372174 | A1* | 12/2014 | Torgerson | G06Q 30/0201 705/7.31 |
| 2015/0106112 | A1* | 4/2015 | Jackson | G16H 50/20 705/2 |

OTHER PUBLICATIONS

Lempert et al., "Comparing Algorithms for Scenario Discovery", RAND Infrastructure, Safety, and Environment. Mar. 1, 2008; pp. 1-35. https://pdfs.semanticscholar.org{be50/8443c1a19c46d37355891b08714abbd9b588.pdf.

Polonik et al., "PRIM Analysis", Journal of Multivariate Analysis, Academic Press. vol. 101. No. 3; Mar. 1, 2010.

Sniadecki et al., "Bump Hunting with SAS: A Macro Approach to ploying PRIM", SAS Global Forum—Data Mining and Text Analytics. Jan. 1, 2011. http://support.sas.com/resourcesfpapersfproceedings11/156-2011.pdf.

\* cited by examiner

METHOD, IMPLEMENTED BY COMPUTER, FOR SEARCHING FOR RULES OF ASSOCIATION IN A DATABASE

RELATED APPLICATIONS

This present application is a National Phase entry of PCT Application No. PCT/FR2018/050965 filed Apr. 17, 2018 which claims priority to French Application No. 1754037 filed May 9, 2017, the contents of each being incorporated herein by reference in their entireties.

TECHNICAL FIELD

The present invention relates to the general field of processing data structures in databases, and in particular to the methods, implemented by computer, of searching for rules of associations in voluminous databases.

The present invention more particularly relates to a method, implemented by a processing unit of a computer and/or by a programmable or reprogrammable logic circuit, for searching for rules of association in a database. The present invention also relates to a computer program product that comprises instructions for the execution of such a method of searching, as well as a recording support on which is recorded a computer program comprising program code instructions for implementing all or a portion of the steps of this method.

Many industrial applications of the present invention have been identified, including, without this list being complete, devices for analyzing breakdowns in industrial systems, devices for detecting the vigilance of the driver in a vehicle, or devices for searching for cause and effect relations in medical or pharmaceutical data.

BACKGROUND ART

In general, the techniques for exploring data in a database can be separated into two major categories that characterize two levels of exploration:
the exploitation of transactional data and of queries;
the exploration of data for business intelligence.

The technique of exploitation of transactional data and of queries concerns data of which the initial purpose is archival, and makes it possible to extract information that is known to be held. The technique of exploration of data for business intelligence however makes it possible on the one hand to produce new information from the data, and on the other hand to benefit from strategic improvements aiming at a competitive advantage or better management of the risks and of the costs, through the production of responses to non-trivial questions that are not accessible via traditional queries.

In the case of techniques of exploration of data for business intelligence, the purpose is to model a behavior on the data in order to extract therefrom information that is a priori not sure to be able to be understood, and of which the structure will depend on the type of problem that one is confronted with. The raw material is the exploration of processed and clean data, organized in the base in the form of tables of which the columns represent variables and the lines instances (for example individuals, or instants for time series). According to the objective pursued (description or prediction), the type of data (numerical or textual, quantitative or qualitative, discrete or continuous) and the problem posed, this entails modeling and estimating the relationships between the data (linear, logistic or other regressions), classifying the individuals (via decision trees, neural networks or other), creating risk and appetite scores for clients and prospects, producing forecasts of economic and financial variables, and many other applications that entail a large variety of fields. There are therefore two major families of approaches for conducting the exploration of data:

modeling: in certain activities and for certain given situations, models are able to describe the operation of a complex system. These models introduce variables and associated parameters, as well as their relationships. The data is then used to estimate the parameters and validate the pertinence of the variables, then to confirm or dispel the theory.

Techniques for classification or searching for rules of association: many of the new industrial activities or services in the last few years have given rise to new data that escapes modeling. A problem that then arises is that of the use of the considerable mass of the data collected in order to improve the effectiveness of the companies with regard to their clients when they are involved in activities for which the relationships between the variables are not well known.

In these latter situations, which escape modeling (for example due to a lack of pre-established theory, difficulties in determining pertinent variables with regard to the profusion of data, or the combinatorial explosion linked to the necessity of using a maximum of variables in order to understand complex systems), it is common to use the calculating power of computers to produce solutions, that are exact, or approximate, or local.

Most of the time, there is no algorithm that makes it possible to resolve the problem within a reasonable amount of time. This is referred to as an NP-difficult problem in mathematics. A classic case is that of the business traveler: the latter must minimize the distance required to travel in order to connect during his business trip a certain number of cities of which the distances are known two-by-two. A first method aiming at resolving this problem, conceptually simple, consists in listing all of the possible itineraries that pass through all of the cities one time and one time only, in calculating the total length, and in choosing the shortest itinerary. To date, no mathematical solution makes it possible to find the global optimum for this problem in polynomial time, i.e. in a period of time that does not increase exceptionally fast as instances (here, cities) are added. Combinatorics indicates to us that the naive solution of the counting very quickly becomes impracticable even for powerful computers in a reasonable amount of time, beyond a few tens of cities. Thus, we can attempt to find local optimums.

In the situations that escape from modeling, and which are represented by a database, other techniques are known aiming at identifying, in this base, pertinent data that forms as many solutions to a given NP-difficult problem.

Thus known are methods, implemented by computer, for searching for rules of associations in a database. Among the latter, a method is known in particular, implemented by computer, as known under the acronym PRIM (Patient Rule Induction Method). In this method for searching for rules of associations, a database is stored in means of memorization of the computer and comprises a set of data. The set of data is organized in the form of a list of instances, with each instance being defined by a set of real numerical values taken by a predetermined number of variables. The method comprises a step of selection of a set of N1 variables from among the variables of the list of instances; this set forming a set of input variables and defining a space of dimension N1; and a step of selection of a variable from among the remaining variables of the list of instances, this variable forming an output variable. Each instance is represented by a point in the space of dimension N1. The method further comprises a step of definition of at least one modality for the selected output variable, in other words of a criterion to be verified by the value of this output variable; and a step of definition of a minimum size of regions to be explored in the space of dimension N1. The method further comprises a step of generating, in the space of dimension N1, of regions containing several points that verify the modality defined hereinabove. The PRIM method sequentially generates the regions by suppressing at each step the observations that are already covered. The method finally comprises a step of determination of regions of interest from among these generated regions. Each region of interest thus determined verifies the criterion of minimum size defined hereinabove, and contains a number of points that verify the modality defined hereinabove such that the density of these points in the region is greater than a predetermined threshold density. The limit values of the input variables that delimit each region of interest thus determined define a rule of association in the database.

However, a disadvantage of this PRIM method is that it entails complex and time-consuming calculations with regard to the processing unit of the computer. Furthermore, the database is not explored in an exhaustive way, which is detrimental to the precision of the results obtained. Finally, the implementing of this PRIM method requires providing management for redundant variables, but without being able to carry out the latter upstream. This management of redundant variables, and in particular the suppression of the latter, is thus carried out ex post, which is detrimental here again to the precision of the results obtained.

SUMMARY

A purpose of the present invention is to overcome at least partially the aforementioned disadvantages.

In particular, a purpose of embodiments of the present invention is to propose a method, implemented by computer, for searching for rules of association in a database making it possible to reduce the complexity and the duration of the calculations in the computer, while still improving the precision of the results obtained.

For this purpose, embodiments of the present invention proposes a method, implemented by a processing unit of a computer and/or by a programmable or reprogrammable logic circuit, for searching for rules of association in a database, the database being stored in means for memorizing of the processing unit or in the programmable or reprogrammable logic circuit and comprising a set of data, the set of data being organized in the form of a list of instances, with each instance being defined by a set of real numerical values taken by a predetermined number of variables; with the method comprising the following steps:

the selection of a set of N1 from among the variables of the list of instances, the set of N1 variables forming a set of input variables and defining a space of dimension N1; and the selection of a variable from among the remaining variables of the list of instances, the variable forming an output variable;

the ordering, for each input variable of the selected list of instances, of the numerical values of the instances for this variable, in such a way as to switch from a topology of real values to a topology of ordinal values for the selected input variables, with each instance then being defined by a set of ranks associated with each one of the values of the input variables of this instance, each instance being represented by a point in the space of dimension N1;

the definition of at least one modality for the selected output variable, the modality being defined as a criterion to be verified by the value of the output variable;

the exploration, in sub-spaces of the space of dimension N1, of right convex regions, with each right convex region explored being a hyperrectangle that has, on two diagonally opposite vertices along a long diagonal of the hyperrectangle, two points representing two instances of which the value of the output variable verifies the modality, with each right convex region explored being furthermore the hyperrectangle that, in the sub-space of which the dimension corresponds to the dimension of the hyperrectangle, can be defined unequivocally only by these two points;

the selection, from among the explored right convex regions, of regions of interest, with each selected region of interest containing a number of points that verify the modality such that the density of these points is greater than a predetermined threshold density, with the limit values of the input variables that delimit a given region of interest defining a rule of association in the database.

Via a particular remodeling of the structure of the data of the initial database, as well as of the structure of the retained solutions (remodeling represented in particular by the steps of sequencing and of exploration), the method according to embodiments of the invention advantageously makes it possible to substantially reduce the combinatorial complexity of the calculations, without being detrimental to the precision of the results obtained. The calculations to be carried out by the processing unit thus pass from an exponential complexity (calculations such as carried out in the methods of inducting rules of prior art), to a polynomial complexity, as is demonstrated in the next to last section of the present document. The global processing time thus also becomes polynomial. A substantial gain in memory space and a reduction in hardware resources used for the calculations are thus obtained. These various advantages and technical effects, which will be illustrated at the end of the present document, are indifferent to the semantics of the data used.

Thanks to this passing from an exponential complexity to a polynomial complexity for the calculations to be carried out by the processing unit, the method according to embodiments of the invention can advantageously be applied for industrial applications that implement a large number of instances and variables. Such industrial applications include for example, without this list being complete, devices for analyzing breakdown in industrial systems, devices for detecting the vigilance of the driver in a vehicle, or devices for searching for cause and effect relations in medical or pharmaceutical data.

The method for searching for rules of association according to embodiments of the invention further makes it possible to carry out a more exhaustive exploration of the database, making it possible to improve the precision of the results obtained. Such a more exhaustive exploration makes it possible in particular to construct rules of association which are not based on the global coverage nor on partitioning. A key aspect that makes the method according to embodiments of the invention a more exhaustive search is the non-sequential approach. In particular, the step of exploration of right convex regions is carried out in a non-sequential manner. This non-sequential approach is highly differentiating in comparison with the methods of inducting rules of prior art, in particular in comparison with the PRIM method.

The exploration of right convex regions and the selection, among these explored right convex regions, of regions of interest, are carried out independently for each sub-space of the space of dimension N1, and therefore for each combination of corresponding input variables. Thus, the method of searching for rules of association according to the invention is decentralized. This decentralization advantageously leads to a parallelized calculation, contrary to the PRIM method of prior art wherein the calculations are difficult to parallelize. This parallelization of the calculations is crucial and advantageous from the point of view of reducing the processing time, due to the combinatorial complexity of these calculations.

Advantageously, each selected region of interest further contains a number of points representing instances, called size, such that this number is greater than a predetermined minimum threshold size.

This characteristic makes it possible to further improve the precision of the results obtained.

Advantageously, the method further comprises a step of determination, in each sub-space of the space of dimension N1, of an increase in the size of the right convex regions of this sub-space, and a step of comparison, for each sub-space of the space of dimension N1, between this increase and the minimum threshold size.

These steps make it possible to determine the increase in the size of a right convex region without having to browse through all of the instances represented by the points that verify the modality contained in this region, as well as to know if a sub-space contains a high density of points that verify the modality, without having to explore this sub-space. These steps make it possible to obtain an advantageous reduction in the complexity and in the calculation time.

Advantageously, during the step of exploration, in sub-spaces of the space of dimension N1, of right convex regions, only the sub-spaces for which the determined increase is greater than the minimum threshold size are explored.

This characteristic makes it possible in particular to not explore certain paths of sub-spaces that would be unnecessary to explore. Thus, this characteristic makes it possible to reduce the combinatorial complexity linked to the number of variables and to the number of spaces linked to these variables, and thus make possible an advantageous reduction in the complexity and in the calculation time.

Advantageously, the method further comprises a step of refining selected regions of interest, with the step of refining comprising, for each selected region of interest, a first phase of enlargement, respectively of reduction, of the size of this region by increasing, according to each dimension of the sub-space associated with the region of interest, the value of the maximum rank and/or by decreasing, according to each dimension of the sub-space associated with the region of interest, the value of the minimum rank between the two instances defining the region of interest, for the variable associated with this dimension; respectively by decreasing, according to each dimension of the sub-space associated with the region of interest, the value of the maximum rank and/or by increasing, according to each dimension of the sub-space associated with the region of interest, the value of the minimum rank between the two instances defining the region of interest, for the variable associated with this dimension; and a second phase during which the region of interest thus enlarged, respectively reduced, is added to all of the selected regions of interest if the density of the points of this region verifying the modality is greater than the predetermined threshold density and if the size of this region is greater than the predetermined minimum threshold size.

These characteristics make it possible to optimize the size and the dimension of each selected region of interest, and thus to improve the completeness and the precision of the results obtained. This optimization in the size and the dimension of each selected region of interest is carried out at full visibility.

Advantageously, each selected region of interest defines a sub-set of the set of data organized in the form of the list of instances, and a value-p is calculated for the sub-set of data formed by each selected region of interest, for the modality of the considered output variable.

Advantageously, the method further comprises a step of comparison, for each selected region of interest, between the value-p calculated for this region and a predetermined maximum threshold value, and a step of final selection of the regions of interest for which the calculated value-p is less than the maximum threshold value.

These characteristics make it possible to minimize the probability of erroneously selecting regions of interest, and therefore of the corresponding rules of association, purely random.

Embodiments of the invention also relate to a computer program product that can be downloaded from a communication network and/or recorded on a support that can be read by a computer and/or that can be executed by a processing unit of a computer or by a programmable or reprogrammable logic circuit, comprising program instructions, the program instructions being adapted to implement the steps of the method for searching for rules of association in a database such as described hereinabove when the program product is executed on a processing unit of a computer or on a programmable or reprogrammable logic circuit.

Embodiments of the invention also relate to a recording support, of the programmable or reprogrammable logic circuit type, on which is recorded a computer program comprising program code instructions for implementing all or a portion of the steps of the method for searching for rules of association in a database such as described hereinabove.

Definitions

Computer: any electronic device structured according to an architecture of the "von Neumann" type, and provided with a data processing unit, as well as means of data storage, such as for example a desktop computer, a laptop computer, a wireless communication device such as a smartphone, or a digital tablet, without this list being complete.

Programmable or reprogrammable logic circuit: any integrated logic circuit able to be reconfigured after it is manufactured, such as for example a FPGA circuit (Field-Programmable Gate Array), a PLD circuit (Programmable Logic Device), a EPLD circuit (Erasable Programmable Logic Device), a CPLD circuit (Complex Programmable Logic Device), a PAL circuit (Programmable Array Logic), or a PLA circuit (Programmable Logic Array), without this list being complete.

Instance or individual: set of real numerical values taken by a predetermined number of variables.

Class of an instance or of an individual: numerical value taken by an output variable for this instance or this individual.

Attributes of an instance or of an individual: set of numerical values taken by several input variables for this instance or this individual.

Modality: criterion to be verified by the value of an output variable.

List of instances or of individuals: set of several instances or individuals selected from among a given population.

Space or sub-space: set of n dimensions among the N dimensions (n≤N).

Region of a space: closed sub-portion of a space.

Hyperrectangle: n-dimensional analog of a rectangle in two dimensions, and of a rectangle parallelepiped in three dimensions.

Vertices of a hyperrectangle diagonally opposite according to a long diagonal of this hyperrectangle: two vertices of a hyperrectangle that are opposite according to a long diagonal, in the geometrical sense of the term, of this hyperrectangle, i.e. according to a diagonal such that the shortest path (on the edges of the hyperrectangle) connecting the two opposite vertices according to this diagonal use exactly a number of edges equal to the number of dimensions of this hyperrectangle.

BRIEF DESCRIPTION OF THE FIGURES

Other characteristics and advantages of embodiments of the invention shall appear when reading the following description, in reference to the accompanying figures, wherein.

For increased clarity, identical or similar elements are marked with identical reference signs on all of the figures.

DETAILED DESCRIPTION

In what follows, a method for searching for rules of association in a database 2 is disclosed in particular.

Figure 1:
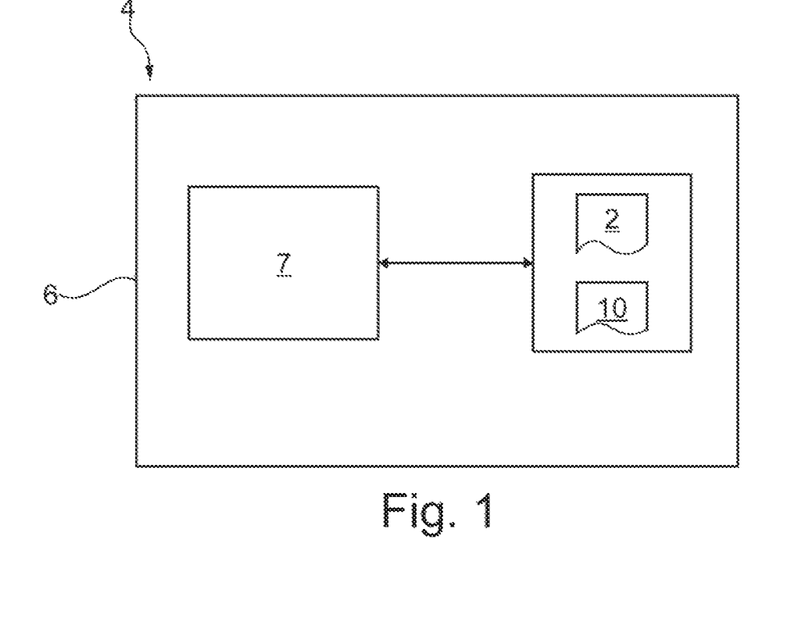
FIG. 1 diagrammatically shows a computer, comprising a processing unit and memory means storing an application that is able to implement the method for searching for rules of association according to an embodiment of the invention.

A computer 4 is diagrammatically shown in FIG. 1. The computer 4 is provided with a processing unit 6. The processing unit 6 comprises for example a processor 7 and means for memorization 8 connected to the processor 7.

The means for memorization 8 store the database 2, as well as an application 10.

The database 2 comprises a set of data.

Figure 2:
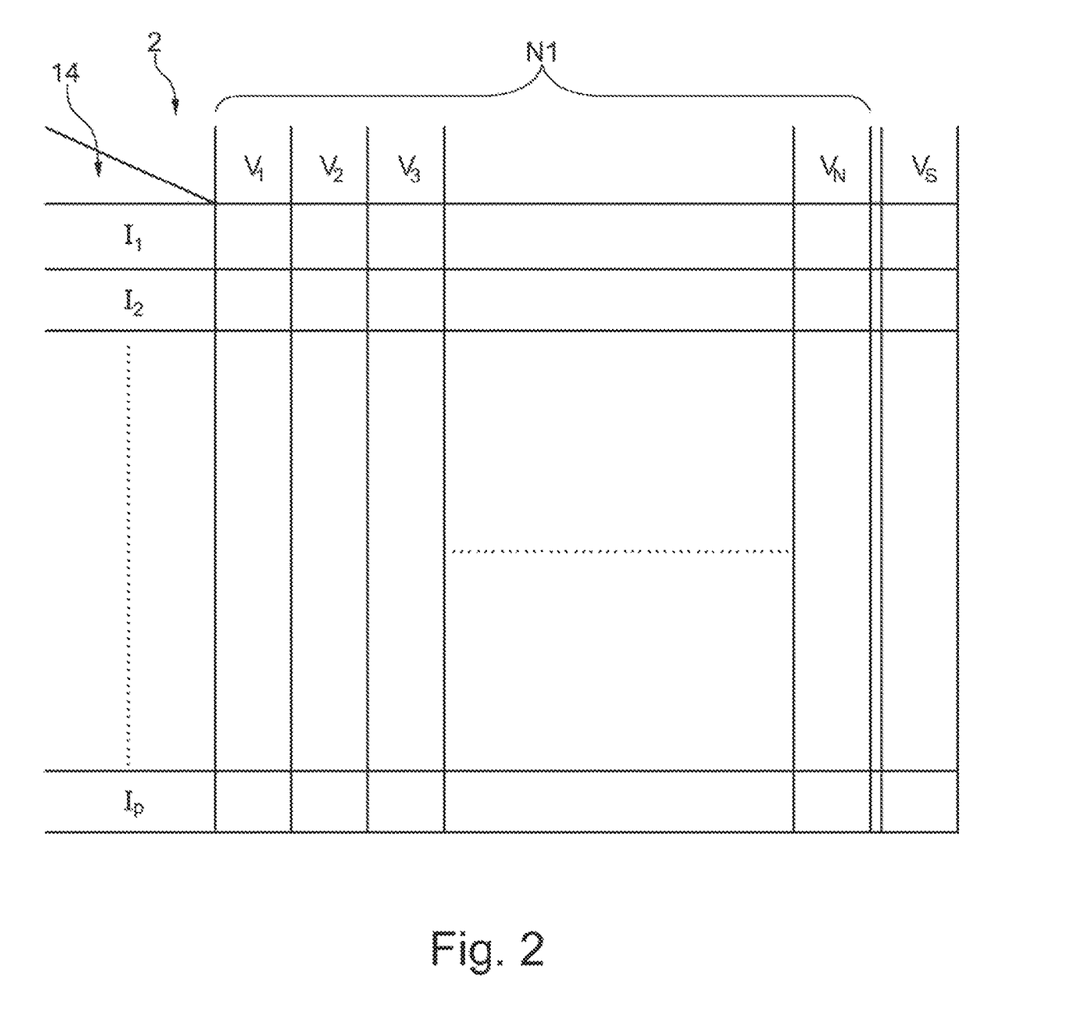
FIG. 2 diagrammatically shows an example of a database wherein the method for searching for rules of association according to an embodiment of the invention can be applied.

The set of data is organized in the form of a list 14 of instances $I_1, \ldots I_P$, as shown in FIG. 2. Each instance $I_1, \ldots I_P$ is defined by a set of real numerical values taken by a predetermined number of variables $V_1, \ldots V_N, V_S$. The variables $V_1, \ldots V_N, V_S$ can for example be variables represented by real numerical values.

The application 10 is able to be executed by the processor 7 of the processing unit 6, and comprises instructions for the execution of a method for searching for rules of association according to an embodiment of the invention, as shall be detailed in what follows. The application 10 is for example an application that can be downloaded, via a downloading platform not shown in the figures.

Figure 3:
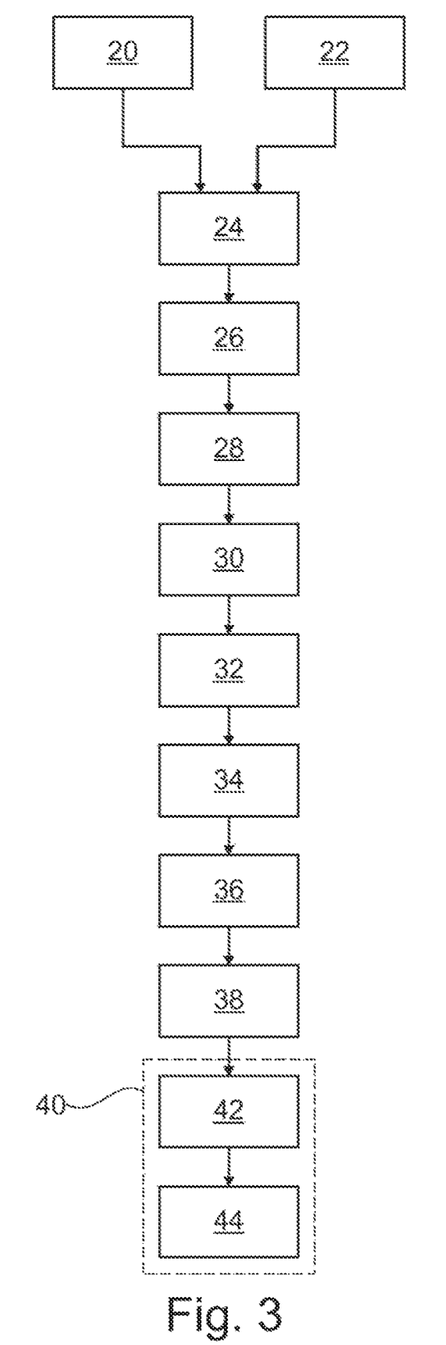
FIG. 3 is a flow chart showing the method for searching for rules of association in a database according to an embodiment of the invention.

The method for searching for rules of association in the database 2, implemented by the processing unit 6 of the computer 4, shall now be described in detail, in reference to FIG. 3. It is assumed that initially the application 10 is executed by the processor 7 of the processing unit 6.

The method comprises an initial step 20 during which a set of N1 variables $V_2, \ldots V_N$ are selected from among the variables $V_1, \ldots V_N, V_S$ of the list 14 of instances. The set of N1 variables $V_2, \ldots V_N$ forms a set of input variables and defines a space of dimension N1.

During a parallel or following step 22, a variable $V_S$ is selected from among the remaining variables $V_1, V_S$ of the list 14 of instances. The variable $V_S$ forms an output variable. The variable $V_S$ can for example be a categorical variable that can have a predetermined number of categorical values.

Figure 4:
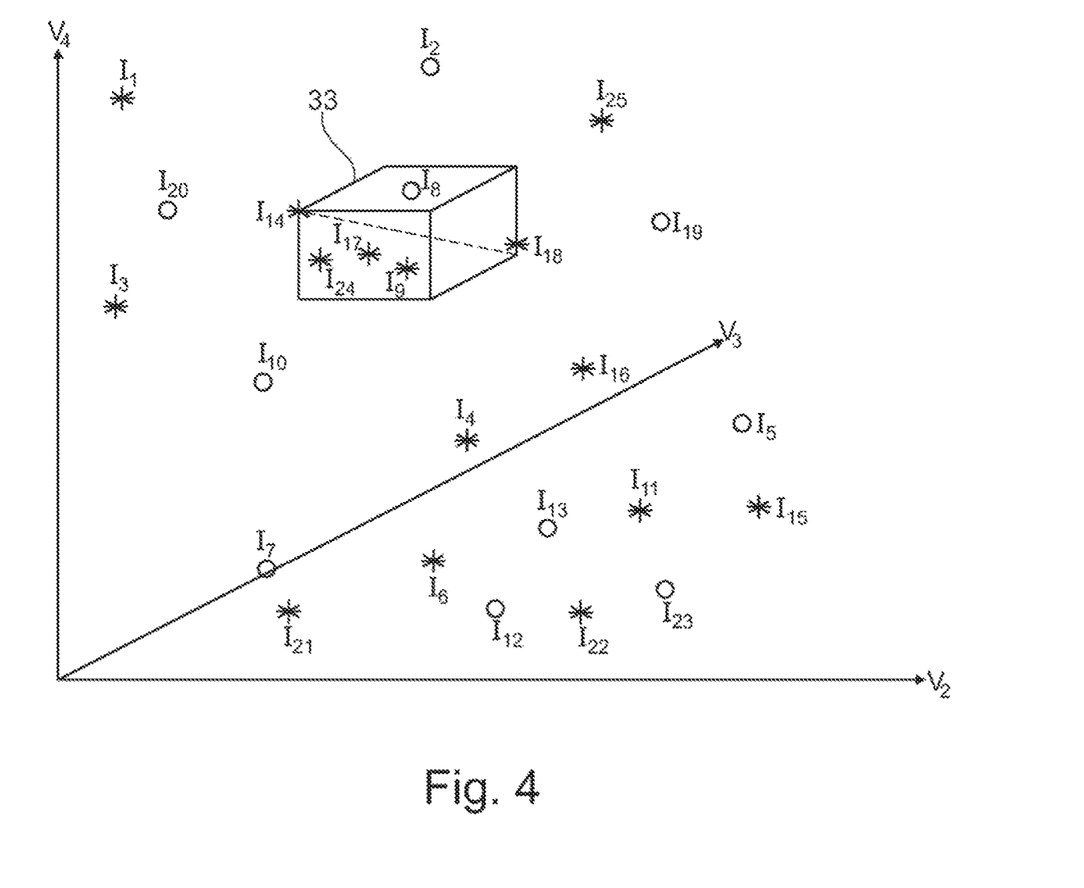
FIG. 4 diagrammatically shows a particular step of the method of FIG. 2, showing the representation of a particular right convex region, in a three-dimensional space.

During a following step 24, for each selected input variable $V_2, \ldots V_N$, the numerical values of the instances are sequenced for this variable, in such a way as to switch from a topology of real values to a topology of ordinal values for the selected input variables $V_2, \ldots V_N$. Each instance $I_1 \ldots I_P$ is then defined by a set of ranks associated with each one of the values of the input variables $V_2, \ldots V_N$ of this instance. Each instance $I_1, \ldots I_P$ is then represented by a point in the space of dimension N1 formed by the set of N1 input variables $V_2, \ldots V_N$, as shown in the example illustrated in FIG. 4, example for which N1 is equally to three (three selected input variables $V_2, V_3, V_4$), and P is equal to twenty-five (twenty-five instances $I_1, \ldots I_{25}$). This step of sequencing 24 into ranks makes it possible to discretize the numerical values of the instances $I_1, \ldots I_P$ for the input variables $V_2, \ldots V_N$, and thus be able to render the problem countable. Indeed, such a step of sequencing into ranks makes it possible to avoid a large number of calculations, while still retaining the same topology of results. This makes it possible to simplify the combinatorial analysis without losing the generality of the results, as shall be described in what follows in liaison with the step 32 of exploration. Advantageously, during this step of sequencing 24, a processing of any duplicates of values of input variables is carried out, so that no duplicate remains of ranks for the same input variable at the end of this step. Such a processing can for example consist, if two values of the same input variable are identical for two instances, in assigning to them a different consecutive rank. An alternative of such processing can consist in using another variable, which indicates the number of instances that have the same rank for the considered input variable.

During a following or parallel step 26, at least one modality is defined for the selected output variable $V_S$. A modality is defined as a criterion to be verified by the value of the output variable $V_S$. In the embodiment shown in FIG. 4, the output variable $V_s$ is a binary variable that can have two distinct values: a first value represented by a star in the space of dimension N1, and a second value represented by a circle in this same space. According to the particular embodiment, the modality defined for this output variable $V_S$ is the first value.

In an alternative not shown, the steps of sequencing 24 and of defining of at least one modality 26 can be inverted.

Preferably, the method comprises a following step 28 of determination, in each sub-space of the space of dimension N1, of an increase in the size of the right convex regions of this sub-space; as well as a step 30 of comparison, for each sub-space of the space of dimension N1, between this increase and a predetermined minimum threshold size. The size of a given right convex region is defined as the number of points that represent instances $I_1 \ldots I_P$ that are contained, in the geometrical sense of the term, in the closed set formed by this right convex region.

During a following step 32, right convex regions are explored in sub-spaces of the space of dimension N1. Each explored right convex region is a hyperrectangle that has, on two diagonally opposite vertices according to a long diagonal of this hyperrectangle, two points that represent two instances $I_1, \ldots I_P$ of which the value of the output variable $V_S$ verifies the modality defined hereinabove for this variable $V_S$ in the step 26. More precisely, with each right convex region explored is the hyperrectangle which, in the sub-space of which the dimension corresponds to the dimension of this hyperrectangle, can be defined unequivocally only by these two points. For example, in the particular embodiment shown in FIG. 4, an explored right convex region 33 is represented. This right convex region 33 is the hyperrectangle of dimension three (in other words a rectangle parallelepiped) that has, on two diagonally opposite vertices according to a long diagonal of the parallelepiped, two points that represent two instances $I_{14}$, $I_{18}$ of which the value of the output variable $V_S$ verifies the modality (first value represented by a star), and which can be defined unequivocally only by these two points $I_{14}$, $I_{18}$.

Preferably, when the method comprises the step 28 of determination and the step 30 of comparison, only the sub-spaces for which the determined increase is greater than the predetermined minimum threshold size are explored during the step 32 of exploration. This makes it possible to not explore certain paths of sub-spaces that would be unnecessary to explore. Thus, this characteristic makes it possible to reduce the combinatorial complexity linked to the number of variables and to the number of spaces linked to these variables, and thus make possible an advantageous reduction in the complexity and in the calculation time.

During a following step 34, certain regions of interest are selected from among the explored right convex regions. Each selected region of interest contains a number of points $I_1, \ldots I_P$ verifying the modality defined hereinabove in the step 26 such that the density of these points is greater than a predetermined threshold density. Advantageously, each selected region of interest further contains a number of points $I_1, \ldots I_P$, called size, such that this number is greater than the predetermined minimum threshold size. For example, in the particular embodiment shown in FIG. 4, the explored right convex region 33 was selected as a region of interest for the modality of the variable $V_S$ considered. Indeed, by considering that the minimum threshold size was five points and that the threshold density was four points, the right convex region 33 contains six points $I_8, I_9, I_{14}, I_{17}, I_{18}$ that represent instances, and contains, among these six points, five points $I_9, I_{14}, I_{17}, I_{18}$ of which the value of the output variable $V_S$ verifies the modality (first value represented by a star).

Each selected region of interest defines a subset of the set of data organized in the form of the list 14 of instances. The limit values of the input variables $V_2, \ldots V_N$ that delimit a given region of interest define a rule of association in the database 2. When a new instance of which only the values of the input variables are known is then added to the list 14 of instance of the database 2, such a rule of association then makes it possible to optionally predict the state of the output variable $V_s$ for this new instance. Indeed, if the point that represents this new instance is known, in the geometrical sense of the term, in the closed set formed by the right convex region of interest defining the rule of association, it is possible to predict that the state of the output variable $V_S$ for this new instance will correspond to the modality defined hereinabove for this output variable $V_S$.

Preferably, at the end of the step 34 of selection, a value-p is calculated for the sub-set of data formed by each selected region of interest, for the modality defined hereinabove for the output variable $V_S$ in the step 26. The term "value-p" means the probability, in a statistical test, of obtaining the same value of the test if the null hypothesis were true. In the present case the test consists, for an explored right convex region, in verifying if this region contains a number of points $I_1, \ldots I_P$ that verify the modality defined hereinabove in the step 26 such that the density of these points is greater than the predetermined threshold density. This value-p thus makes it possible in the present case to determine to what extent the selection of a given region of interest, and therefore of the corresponding rule of association, is statistically significant.

Again preferably, when a value-p is calculated for the sub-set of data formed by each selected region of interest, the method comprises a following step 36 of comparison, for each selected region of interest, between the value-p calculated for this region and a predetermined maximum threshold value, and a step 38 of final selection of the regions of interest for which the value-p calculated is less than this maximum threshold value.

These steps of comparison 36 and of final selection 38 make it possible to minimize the probability of erroneously selecting regions of interest, and therefore corresponding rules of association, purely random.

Preferably, the method further comprises a following step 40 of refining selected regions of interest. The step of refining 40 comprises, for each selected region of interest, a first phase 42 of enlarging or of reducing the size of this region, and a second phase 44 during which the region of interest thus enlarged or reduced is added to all of the selected regions of interest if the density of the points $I_1, \ldots I_P$ of this region that verify the modality defined hereinabove is greater than the predetermined threshold density, and if the size of this region is greater than the predetermined minimum threshold size.

When it is a question of an enlargement of the size of the region of interest, the first phase 42 consists in the increase, according to each dimension of the sub-space associated with this region of interest, the value of the maximum rank between the two instances of which the two representative points define this region of interest, for the variable associated with this dimension. Alternatively or as a supplement, this first phase 42 can also consist in this case in the reduction, according to each dimension of the sub-space associated with this region of interest, the value of the minimum rank between the two instances of which the two representative points define this region of interest, for the variable associated with this dimension.

When it is a question of a reduction in the size of the region of interest, the first phase 42 consists in the reduction, according to each dimension of the sub-space associated with this region of interest, the value of the maximum rank between the two instances of which the two representative points define this region of interest, for the variable associated with this dimension. Alternatively or as a supplement, this first phase 42 can also consist in this case in the increase, according to each dimension of the sub-space associated with this region of interest, the value of the minimum rank between the two instances of which the two representative points define this region of interest, for the variable associated with this dimension.

This step of refining 40 makes it possible to refine the retained solutions, by locally optimizing as well as in terms of dimensionality the regions of interest selected during the step of selection 34 or 38, this in order to identify regions of interest that are even better. This step of refining 40 thus makes it possible to optimize the size and the dimension of each selected region of interest, and to improve the completeness and the precision of the results obtained.

Figure 5:
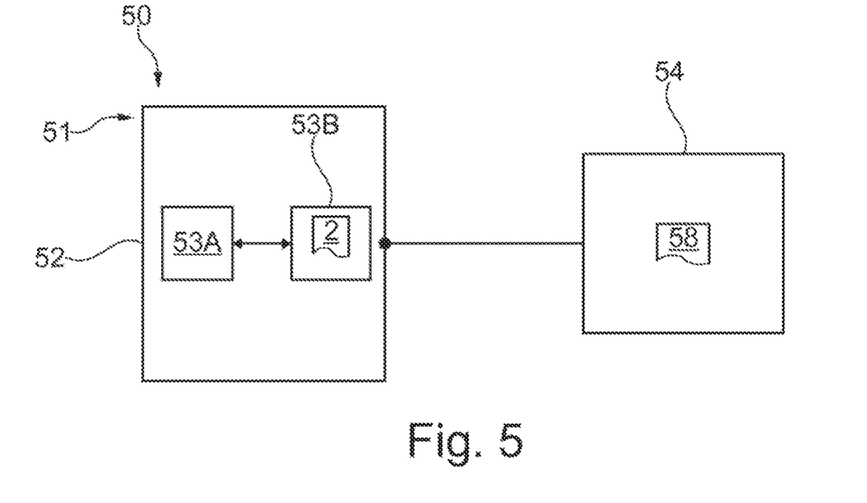
FIG. 5 diagrammatically shows a computer—programmable or reprogrammable logic circuit unit, with the logic circuit storing an application able to implement the method according to an embodiment of the invention.

A unit 50 comprising a computer 51 and a programmable or reprogrammable logic circuit 54 is diagrammatically shown in FIG. 5.

The computer 51 is provided with a processing unit 52. The processing unit 52 comprises for example a processor 53A and means of memorization 53B connected to the processor 53A. The means of memorization 53B store the database 2.

The programmable or reprogrammable logic circuit 54 stores an application 58. The programmable or reprogrammable logic circuit 54 thus forms a recording support on which the application 58 is recorded.

The application 58 is able to be executed by the programmable or reprogrammable logic circuit 54, upon instruction from the computer 51, and comprises instructions for the execution of the method of searching for rules of association according to the invention. This execution of the method is carried out in a manner that is similar to that which was described hereinabove in liaison with the implementation of the application 10, and therefore will not be described in any further detail here.

This porting of the application 58 on the programmable or reprogrammable logic circuit 54 advantageously makes it possible to multiply the calculation speed while still substantially reducing the logistics and environmental cost of the use of a single computer.

Alternatively, the application 58 is stored in the means of memorization 53B of the computer 51 or in the programmable or reprogrammable logic circuit 54, and can be executed in part by the processor 53A of the processing unit 52, and in part by the programmable or reprogrammable logic circuit 54.

Embodiments of the invention are depicted and described in detail in the drawings and the preceding description. The latter must be considered as for the purposes of illustration and given as an example and not as limiting the invention to this single description. Many alternative embodiments are possible.

Algorithmic Complexity of the Method
Mathematical Formulation of the Problem to be Resolved Let M and N be the number of instances and the number of input variables of the database. Let C be the class of the output variable.

The support (respectively the size) of any right convex region R is defined as follows:

$$\hat{\beta}_R = \frac{1}{M} \sum_{m \in R} 1(m \in R)$$

$$(\text{respectively } T_R = M\hat{\beta}_R)$$

Its average (respectively its purity) is defined as follows:

$$\bar{y}_R = \frac{1}{M\hat{\beta}_R} \sum_{m \in R} 1(y_m \in C)$$

$$(\text{respectively} = M\bar{y}_R)$$

We are seeking all of the regions $(R^{n,k^n})_{ij}$, $n \leq N$, $(i,j) \in [1, M]^2$ of which the purity on the specified modality of the output variable is greater than a certain threshold, and of which the size is, preferably, reasonably substantial.

Complexity of the Problem—"Naive" Approach by Exhaustive Listing of the Solutions We need to discretize the space in order to be able to count the possible solutions. Indeed, in the general case where the dimensions of the problem are represented by real numerical variables, there is an infinite number of coordinate points that make it possible to serve as a basis for the construction of a right convex region.

A natural method for carrying out the discretization of the space—and therefore to render the problem countable—consists in limiting the precision of the coordinates of the points that compose the space of the instances. A precision with p digits after the decimal point is then chosen for a range of values extending in an interval [m; M]. In this case, the natural discretization is done in $10^P \times (M-m)$ distinct values.

By carrying out two hypotheses, we can simplify the combinatorial analysis without losing generality of the results:
 a. Identical discretization on all the dimensions
 b. Duplicates are not taken into account Counting of the Possible Solutions in a Space of D Dimensions For a discretization at $n = 10^P \times (M-m)$ distinct values, there are $n^D$-tuples of coordinates, of which we can choose 2 distinct elements, necessary and sufficient to characterize a right convex region. By using the conventional notion of mathematical combinatorics, there are $$C_{n^D}^2 = \frac{n^D!}{(n^D - 2)! \, 2!}$$

ways to choose 2 elements from among a set containing $n^D$ elements. We must divide this number by the number of diagonals that a right convex region has into D dimensions, or $2^{D-1}$, since all of the pairs of corresponding diagonal points all define the same region.

The order of the combinatorial complexity linked to the exploration of a space of dimension D is therefore:

$$\left(\frac{n^2}{2}\right)^D$$

Counting of the Sub-Spaces of Dimension d≤D

Still using the notations of combinatorics, the exploration of the set of sub-spaces generated by the various combinations of variables of the problem, requires the counting of all the possible choices of d elements from among D, for d∈[1;D].

There are $\Sigma_{d\in[1,D]}C_D^d = 2^D - 1$.

General Combinatorial Complexity for a Discretization at n Values on D Dimensions The magnitude of the size of the problem is therefore the product of the two magnitudes of the aforementioned counts, which is a complexity of $n^{2D}$, which characterizes a highly exponential increase according to the level of discretization and the number of dimensions.

For a problem that entails 10 variables:
Discretization at 10 values: 100 billion solutions approximately For a problem that entails 20 (respectively 50) variables:
Discretization at 1,000 values: $10^{120}$ (resp. $10^{300}$) solutions approximately....

It is of course impossible to numerically process such an incommensurable number of solutions. It is necessary to further restrict the construction of the right convex regions of interest in order to render the exploration realizable numerically.

General Combinatorial Complexity for a Discretization at M Instances on D Dimensions We are limiting ourselves to the analysis of regions of which the ends (diagonal points) correspond to instances of the database. Thus, in the case of a problem containing M instances (corresponding to M D-tuples of coordinates in the space of variables), the following results are obtained:

Counting of $R^{M,D} = \{(R^{d,k^d})_{ij}, d \leq D, (i,j) \in [1,M]^2\}$

For a number of dimensions d chosen from among D, and a combination $k^d$ of variables, there are $C_M^2$ right convex regions, and $C_D^d$ combinations of variables. Thus, card $(R^{M,D}) = C_M^2 \times \Sigma_{d\in[1,D]}C_D^d$.

$$\text{Recall } C_M^2 = \frac{M!}{(M-2)!2!} \text{ and } \sum_{d\in[1,D]} C_D^d = 2^D - 1.$$

The magnitude of the complexity of the problem thus constrained is therefore: $M^2 \times 2^D$.

Numerically,
The number of possible regions increases with the square of the number of instances:
10 variables/10 points 50,000 regions approximately
10 variables/100 points 5 million regions approximately
10 variables/1,000 points 500 million regions approximately The number of possible regions increases exponentially with the number of variables:
10 variables/1,000 points 500 million regions approximately
20 variables/1,000 points 500 billion regions approximately
50 variables/1,000 points 500 billion regions approximately The combination of the two dependencies hereinabove thus gives an exponential complexity, since the global dependency is a power of the number of dimensions ($M^2 \times 2^D$). This combination therefore gives a processing time that is also exponential.

It can easily be seen here that even a database formed from 50,000 values poses a combinatorial problem almost insoluble by brute force. Indeed, even the most powerful computer available on the market would take several years to naively and exhaustively explore all of the solutions.

Complexity of the Problem—Method for Searching for Rules of Association According to the Invention Thanks to the method for searching for rules of association in a database according to the invention, the original complexity of the problem is very substantially reduced. In particular, this complexity is no longer exponential purpose polynomial according to the number of instances.

More precisely, this passing from an exponential complexity to a polynomial complexity of the problems is obtained via:

the step of sequencing, for each input variable of the selected list of instances, of the numerical values of the instances for this variable, in such a way as to switch from a topology of real values to a topology of ordinal values for the selected input variables reduction in the complexity of the problem by a factor that can range from 10 to 10,000 and even much more (increasing factor according to the number of variables)

the step of exploration, in sub-spaces of the space of dimension N1, of right convex regions, with each right convex region explored being a hyperrectangle that has, on two diagonally opposite vertices along a long diagonal of the hyperrectangle, two points that represent two instances of which the value of the output variable verifies the modality, with each right convex region explored being furthermore the hyperrectangle that, in the sub-space of which the dimension corresponds to the dimension of the hyperrectangle, can be defined unequivocally only by these two points.

reduction in the complexity of the problem by a factor that can range from 10 to 100 (increasing factor according to the number of instances)

Numerically, for D dimensions and M instances, the number of regions to be explored via the implementation of such a step of exploration is:

$$\frac{M \cdot (M-1)}{2}$$

The complexity of the problem becomes polynomial, since the global dependency is according to the square of the number of instances ($M^2$), and no longer depends on the number of dimensions. The global processing time is therefore also polynomial.

It is obtained, according to the initial dimension of the problem, a global reduction in the complexity of this problem by a factor that can range from 100 to 1,000,000, and even much more in spaces of data with a high dimensionality. This reduction is obtained solely by working ingenuously on the structure of the data of the initial database, as well as on the structure of the retained solutions.

Numerical Examples (Processing Times Compared)

The examples hereinafter were executed on a Dell Optiplex 380 machine (registered trademarks) having as a central unit an Intel Core 3 Duo E8400 operating at 3 GHz and with a central memory of 4 Go. The operating system of this machine is Windows 7 Professional 64 bits.

The data used varied from 100 to 500 entities and from 5 to 10 dimensions.

Results

Impact of the Number of Attributes

The number of attributes (the variables attached to the dimensions) results in a low impact on performance. A universe of 100 entities comprising from 5 to 10 attributes (therefore 465 regions regardless of the number of dimensions) is tested is approximately 20 ms.

Execution Time (in ms)

|     | size |    |    |    |    |    |
| --- | ---- | -- | -- | -- | -- | -- |
| Dim | 5    | 6  | 7  | 8  | 9  | 10 |
| 100 | 16   | 22 | 25 | 19 | 16 | 20 |

Impact of the Number of Entities

Exploration of a Single Space

When the universe (here in 5 dimensions) passes from 100 to 500 entities, the execution time passes from 16 to 1,636 ms with a total of the explored regions passing from 465 to 12,850 (Note: explored here is only a single space with 5 dimensions, not all of its sub-spaces).

The exploration time increases indeed with the number of entities, but a deceleration is above all observed: the exploration speed (expressed in regions/s) decreases with the number of entities.

Dimensions: 5

| Size | Time (ms) | Regions | Speed |
| ---- | --------- | ------- | ------ |
| 100  | 16        | 465     | 29,063 |
| 200  | 135       | 2,345   | 17,370 |
| 300  | 417       | 5,043   | 12,094 |
| 400  | 1,082     | 8,761   | 8,097  |
| 500  | 1,636     | 12,850  | 7,855  |

Figure 6:
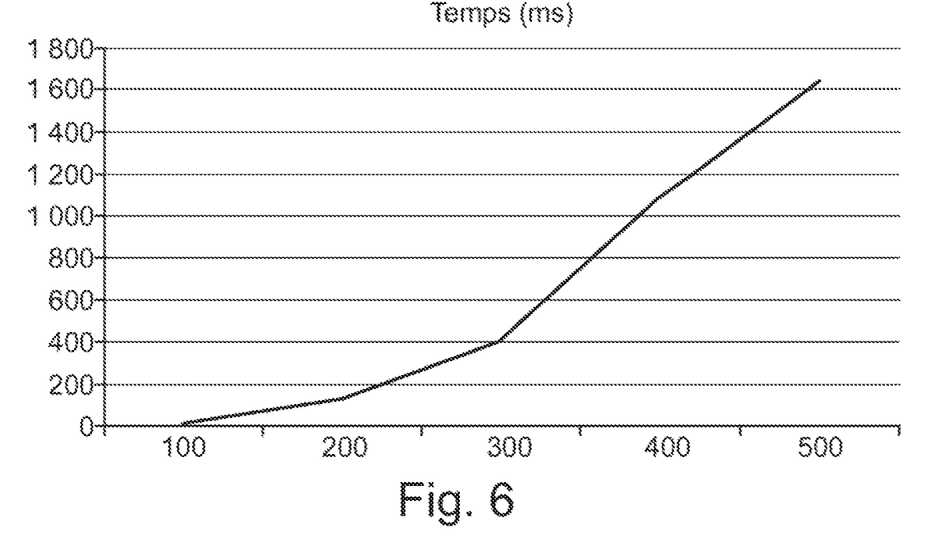
FIG. 6 shows the exploration time in a space according to the number of entities.
Figure 7:
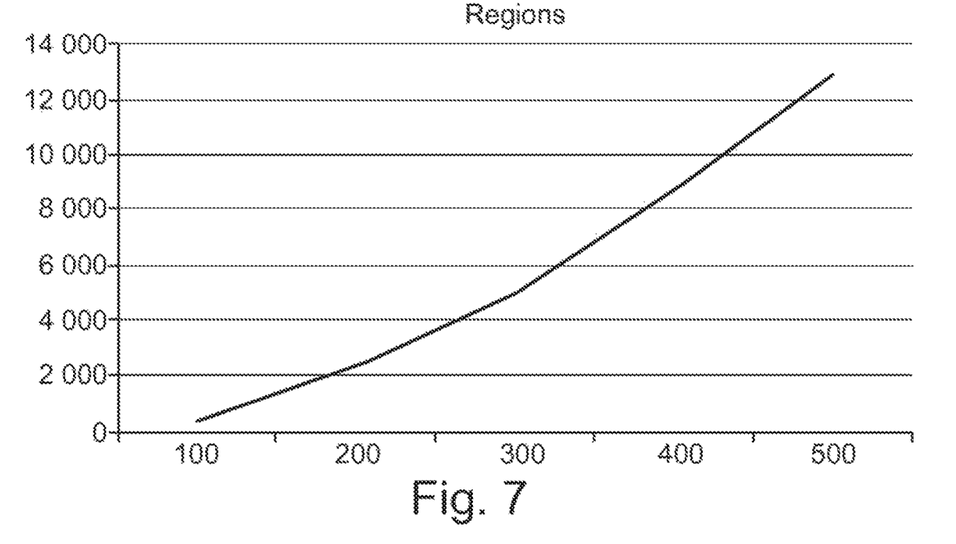
FIG. 7 shows the number of regions according to the number of entities.
Figure 8:
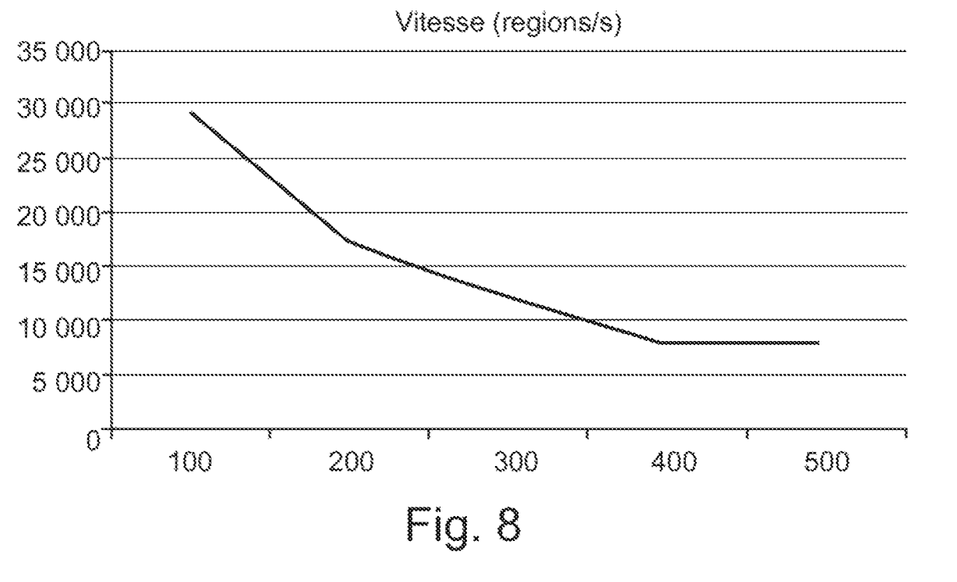
FIG. 8 shows the exploration speed according to the number of entities.

Thus, FIG. 6 shows the exploration time in a space according to the number of entities, FIG. 7 shows the number of regions according to the number of entities and FIG. 8 shows the exploration speed according to the number of entities.

Exploration of all of the Sub-Spaces (1 to 5 Dimensions)

When all of the sub-spaces from 1 to 5 dimensions are explored with a universe containing from 100 to 500 entities, the execution time passes from 251 to 36,257 ms with a total of the explored regions passing from 14,415 to 398,576.

| Size | Time (ms) | Regions |
| ---- | --------- | ------- |
| 100  | 251       | 14,415  |
| 200  | 2,558     | 72,702  |
| 300  | 9,162     | 156,390 |
| 400  | 22,152    | 271,726 |
| 500  | 36,257    | 398,576 |

Impact of the Number of Dimensions

Explored here is a universe of 100 entities in spaces comprising from 1 to 10 dimensions.

| Spaces  | 1-5    | 1-6    | 1-7    | 1-8     | 1-9     | 1-10    |
| ------- | ------ | ------ | ------ | ------- | ------- | ------- |
| Time    | 251    | 490    | 931    | 1,964   | 3,469   | 7,324   |
| Regions | 14,415 | 29,295 | 59,055 | 118,575 | 237,359 | 475,183 |

Figure 9:
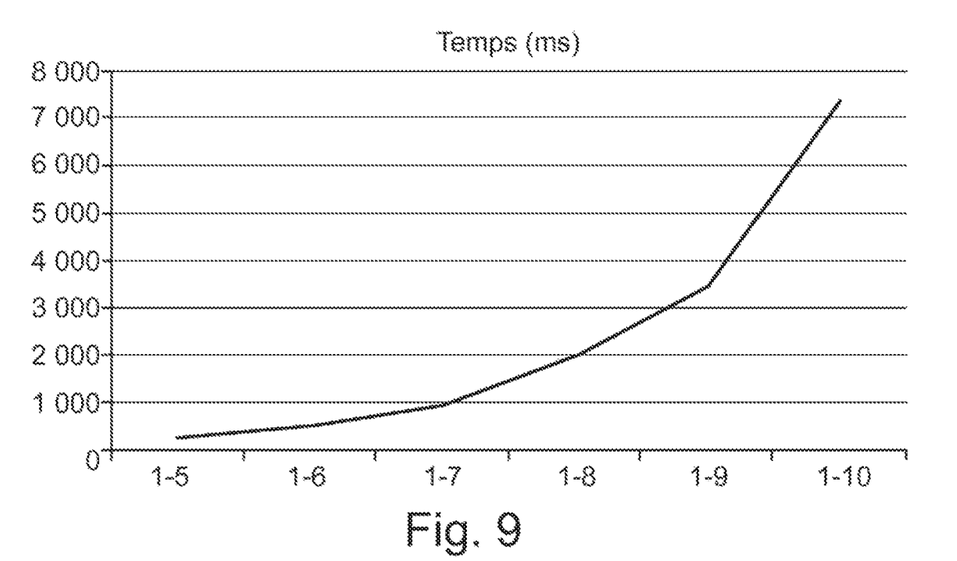
FIG. 9 shows the exploration time in a space according to the number of dimensions.
Figure 10:
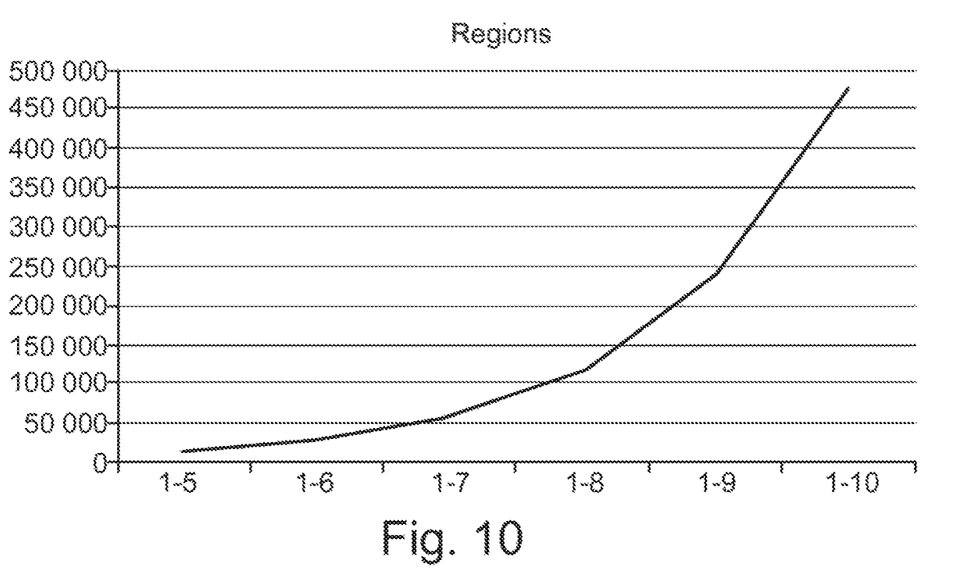
FIG. 10 shows the number of regions according to the number of dimensions.
Figure 11:
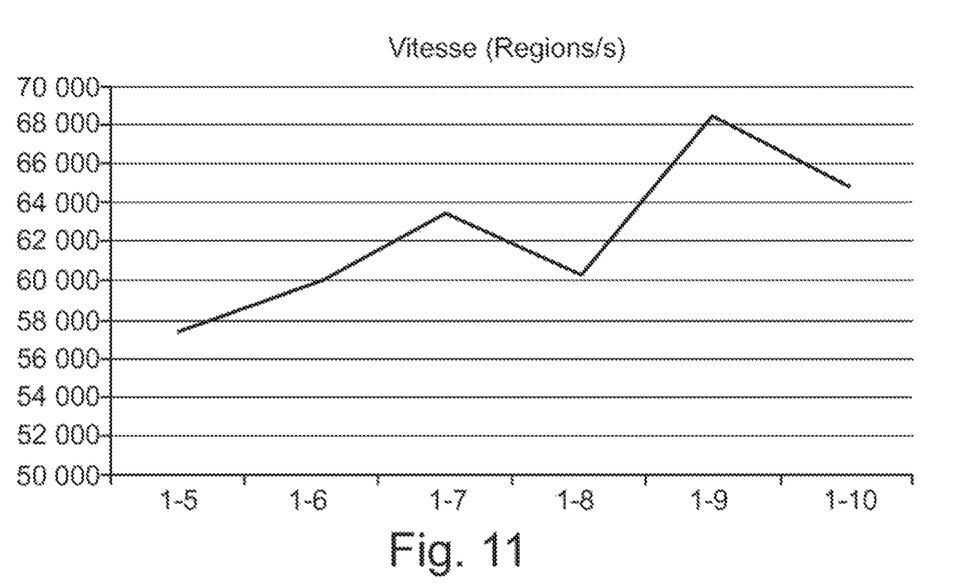
FIG. 11 shows the exploration speed according to the number of dimensions.

Thus, FIG. 9 shows the exploration time in a space according to the number of dimensions, FIG. 10 shows the number of regions according to the number of dimensions and FIG. 11 shows the exploration speed according to the number of dimensions.

It is thus observed that the exploration speed is fairly constant at 62,000 regions/s (here for a universe of 100 entities), but the number of regions increases exponentially with the number of dimensions.

Moreover, the atomic test of membership of an entity to a region depends only somewhat on the number of attributes, the exploration speed decreases with the number of entities, and the total exploration time varies linearly with the number of regions to be explored, but this number increases much faster with the number of dimensions than with the number of entities.

The invention claimed is:

1. Method, implemented by a processing unit of a computer and/or by a programmable or reprogrammable logic circuit, for searching for rules of association in a database, the database being stored in a memory of the processing unit or in the programmable or reprogrammable logic circuit and comprising a set of data, the set of data being organized as a list of instances, with each instance being defined by a set of real numerical values taken by a predetermined number of variables, with the method comprising:

the selection of a set of input variables from among the predetermined number of variables, the set of input variables defining a space of dimension, such that the number of dimensions of the space of dimension equals the number of input variables;

the selection of an output variable from among the predetermined number of variables that are not in the set of input variables;

the ordering of the real numerical values of each input variable, in such a way as to switch from a topology of real values to a topology of ordinal values for the set of input variables;

the ranking of each instance based on the ordinal values of the input variables of the instance, with each instance being represented by a point in the space of dimension, the point having coordinates derived from the ordinal values of the input variables for each instance;

the definition of at least one modality for the selected output variable, the modality being defined as a criterion to be verified by the value of the output variable;

the exploration, in sub-spaces of the space of dimension, of right convex regions, with each right convex region explored being a hyperrectangle that has, on two diagonally opposite vertices along a long diagonal of the hyperrectangle, two points representing two instances of which the value of the output variable verifies the modality, wherein each right convex region explored is the only hyperrectangle that can be defined by the two points within the sub-space corresponding to the dimension of the hyperrectangle; and the selection of regions of interest, from among the explored right convex regions, with each selected region of interest containing a number of points that verify the modality such that the density of the points is greater than a predetermined threshold density, wherein the limit values of the input variables that delimit a given region of interest define a rule of association in the database.

2. Method according to claim 1, wherein each selected region of interest further contains a number of points representing instances, called size, such that the number of points representing instances is greater than a predetermined minimum threshold size.

3. Method according to claim 2, wherein the method further comprises a step of determination, in each sub-space of the space of dimension, of an increase in the size of the right convex regions of this sub-space, and a step of comparison, for each sub-space of the space of dimension, between this increase and said minimum threshold size.

4. Method according to claim 3, wherein, during the step of exploration, in sub-spaces of the space of dimension, of right convex regions, only the sub-spaces for which the determined increase is greater than the minimum threshold size are explored.

5. Method according to claim 2, wherein the method further comprises a step of refining selected regions of interest, with the step of refining comprising, for each selected region of interest, a first phase of enlargement, respectively of reduction, of the size of this region by increasing, according to each dimension of the sub-space associated with said region of interest, the value of the maximum rank and/or by decreasing, according to each dimension of the sub-space associated with said region of interest, the value of the minimum rank between the two instances defining said region of interest, for the variable associated with this dimension; respectively by decreasing, according to each dimension of the sub-space associated with said region of interest, the value of the maximum rank and/or by increasing, according to each dimension of the sub-space associated with said region of interest, the value of the minimum rank between the two instances defining said region of interest, for the variable associated with this dimension; and a second phase during which the region of interest thus enlarged, respectively reduced, is added to all of the selected regions of interest if the density of the points of this region verifying said modality is greater than said predetermined threshold density and if the size of this region is greater than said predetermined minimum threshold size.

6. Method according to claim 1, wherein each selected region of interest defines a sub-set of the set of data organized in the form of the list of instances, and wherein a value-p is calculated for the sub-set of data formed by each selected region of interest, for said modality of the considered output variable.

7. Method according to claim 6, wherein the method further comprises a step of comparison, for each selected region of interest, between the value-p calculated for this region and a predetermined maximum threshold value, and a step of final selection of the regions of interest for which the calculated value-p is less than said maximum threshold value.

8. Computer program product that can be downloaded from a communication network and/or recorded on a support that can be read by a computer and/or that can be executed by a processing unit of a computer or by a programmable or reprogrammable logic circuit, characterized in that it comprises program instructions, said program instructions being adapted to implement the steps of the method for searching for rules of association in a database according to any preceding claim when the program product is executed on a processing unit of a computer or on a programmable or reprogrammable logic circuit.

9. Recording support, of the programmable or reprogrammable logic circuit type, on which is recorded a computer program comprising program code instructions for implementing all or a portion of the steps of the method for searching for rules of association in a database according to claim 1.

* * * * *